United States Patent
Brown et al.

(10) Patent No.: US 8,042,402 B2
(45) Date of Patent: Oct. 25, 2011

(54) MODULAR SENSOR ASSEMBLY

(75) Inventors: Roderick Gordon Brown, Mapperley Park (GB); Harbhajan Singh Mankia, Coventry (GB); Keith Fleming, Leicester (GB)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 12/113,614

(22) Filed: May 1, 2008

(65) Prior Publication Data
US 2009/0272205 A1 Nov. 5, 2009

(51) Int. Cl.
*G01L 7/00* (2006.01)
(52) U.S. Cl. ......................................................... 73/756
(58) Field of Classification Search ........................ None
See application file for complete search history.

(56) References Cited

U.S. PATENT DOCUMENTS

| 4,667,790 | A | * | 5/1987 | Bohle | 192/56.31 |
| 5,025,914 | A | * | 6/1991 | Narushima | 198/660 |
| 2006/0131489 | A1 | | 6/2006 | Riepertinger | |
| 2007/0279173 | A1 | | 12/2007 | Scholz | |

FOREIGN PATENT DOCUMENTS
DE 102004049873 B3 8/2006

OTHER PUBLICATIONS

PCT Search Report issued in connection with corresponding WO Patent Application No. PCT/US2009/039713 filed on Apr. 7, 2009.

* cited by examiner

*Primary Examiner* — Robert Raevis
(74) *Attorney, Agent, or Firm* — Mark A. Conklin; GE Global Patent Operation

(57) ABSTRACT

A modular sensor assembly for performing measurement or calibration is disclosed, comprising a sensing module comprising a threaded spigot, a first slip ring conductive track, and a second slip ring conductive track; a base module comprising a threaded receptacle, a first conductor, and a second conductor; wherein the sensing module is detachably mounted to the base module by rotating the threaded spigot into the threaded receptacle thereby forming a first electrical connection between the first slip ring conductive track and the first conductor, and a second electrical connection between the second slip ring conductive track and the second conductor.

13 Claims, 5 Drawing Sheets

MODULAR SENSOR ASSEMBLY

BACKGROUND OF THE INVENTION

The present invention relates generally to modular sensor assemblies, and more particularly to mechanical and electrical connection of a detachable sensing module to a base module.

Sensors of pressure, temperature, current, etc. are used in a wide range of industrial and consumer applications, including measurement and calibration of components and instruments. Flexibility to use one measurement or calibration system for various measurement or calibration tasks can be achieved by providing detachable sensing modules which can be used with the same base module. Depending upon a particular application, the measurement or calibration system should be able to operate under harsh environmental, vibration, impact, and other operating conditions. The connection between the sensing module and the base module should be able to withstand high pressure for applications involving pressure measurement or calibration.

Known solutions, e.g., Heise PTE-1 Handheld Pressure calibrator available from Dresser Inc. of Newtown, Conn., BETAGAUGE II Pressure Documenting Calibrator available from Hotek Technologies of Tacoma, Wash., MFT 4000 Multifunctional Modular Calibrator available from Meriam Process Technologies of Clevelend, Ohio, and Quickcal 190 Automated Pressure Calibrator available from Transmation Inc. of Everett, Wash., mostly employ sensing modules mountable inside a base module. Mounting a sensing module inside the base module can be undesirable, e.g., in hand held applications where the size of the base unit is of a paramount importance. Conversely, mounting a sensing module outside of the base module poses numerous challenges related to providing reliable mechanical and electrical connection.

Thus, a need exists to provide means and methods of reliable mechanical (including pressure-resistant) and electrical connection of detachable sensing modules to a base module. A further need exists to ensure that the ability of each of the modules (i.e., sending modules and base module) to withstand environmental, handling, storage, and other operational conditions is not dependent upon the modules being mated together.

BRIEF DESCRIPTION OF THE INVENTION

A modular sensor assembly for performing measurement or calibration is disclosed, comprising a sensing module comprising a threaded spigot, a first slip ring conductive track, and a second slip ring conductive track; a base module comprising a threaded receptacle, a first conductor, and a second conductor; wherein the sensing module is detachably mounted to the base module by rotating the threaded spigot into the threaded receptacle thereby forming a first electrical connection between the first slip ring conductive track and the first conductor, and a second electrical connection between the second slip ring conductive track and the second conductor.

BRIEF DESCRIPTION OF THE DRAWINGS

The drawings are not necessarily to scale, emphasis instead generally being placed upon illustrating the principles of the present invention. In the drawings, like numerals are used to indicate like parts throughout the various views.

DETAILED DESCRIPTION OF THE INVENTION

Figure 1:
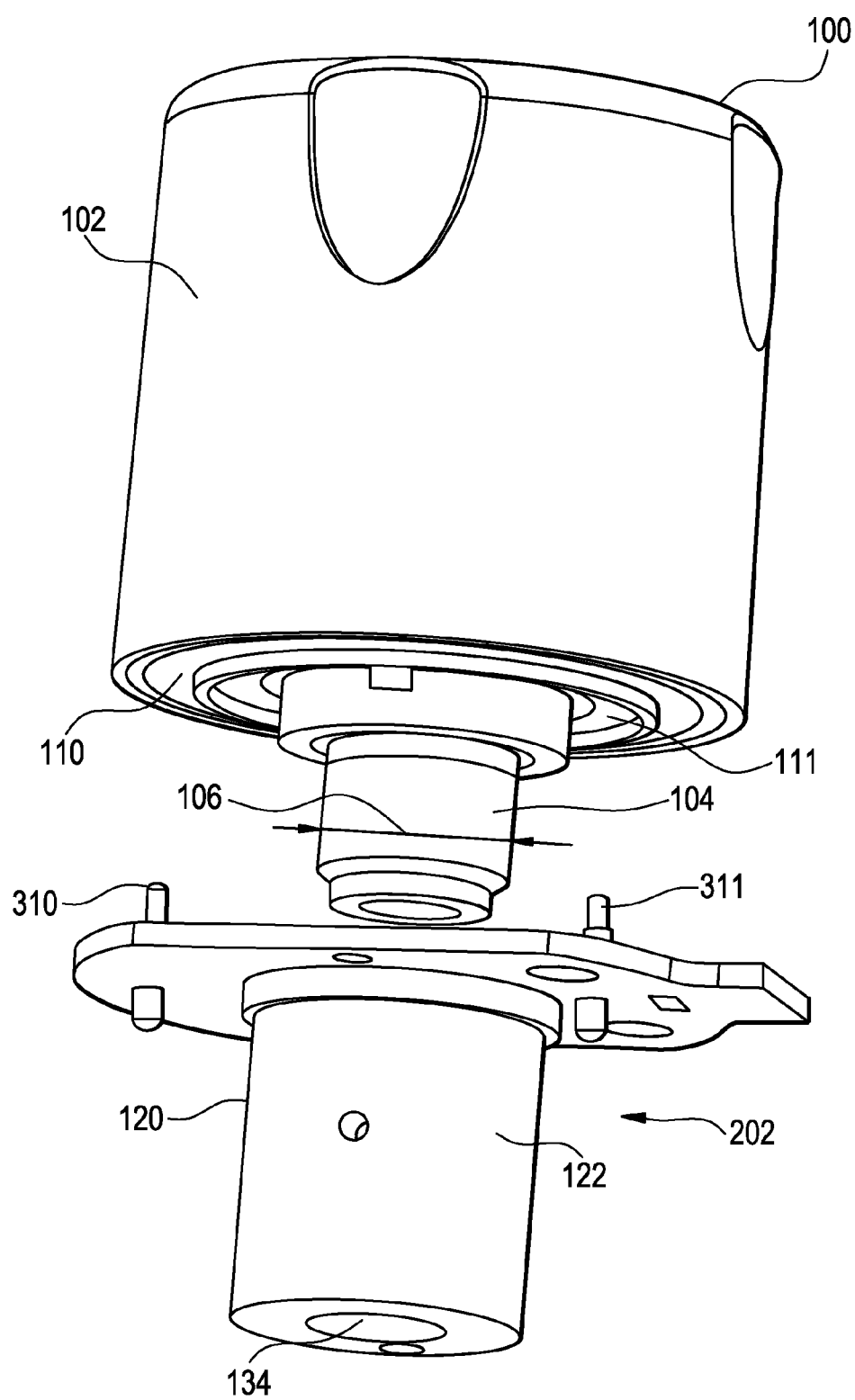
FIG. 1 illustrates an exploded view of one embodiment of an interface between a sensing module and a base module of a measurement or calibration device.
Figure 2:
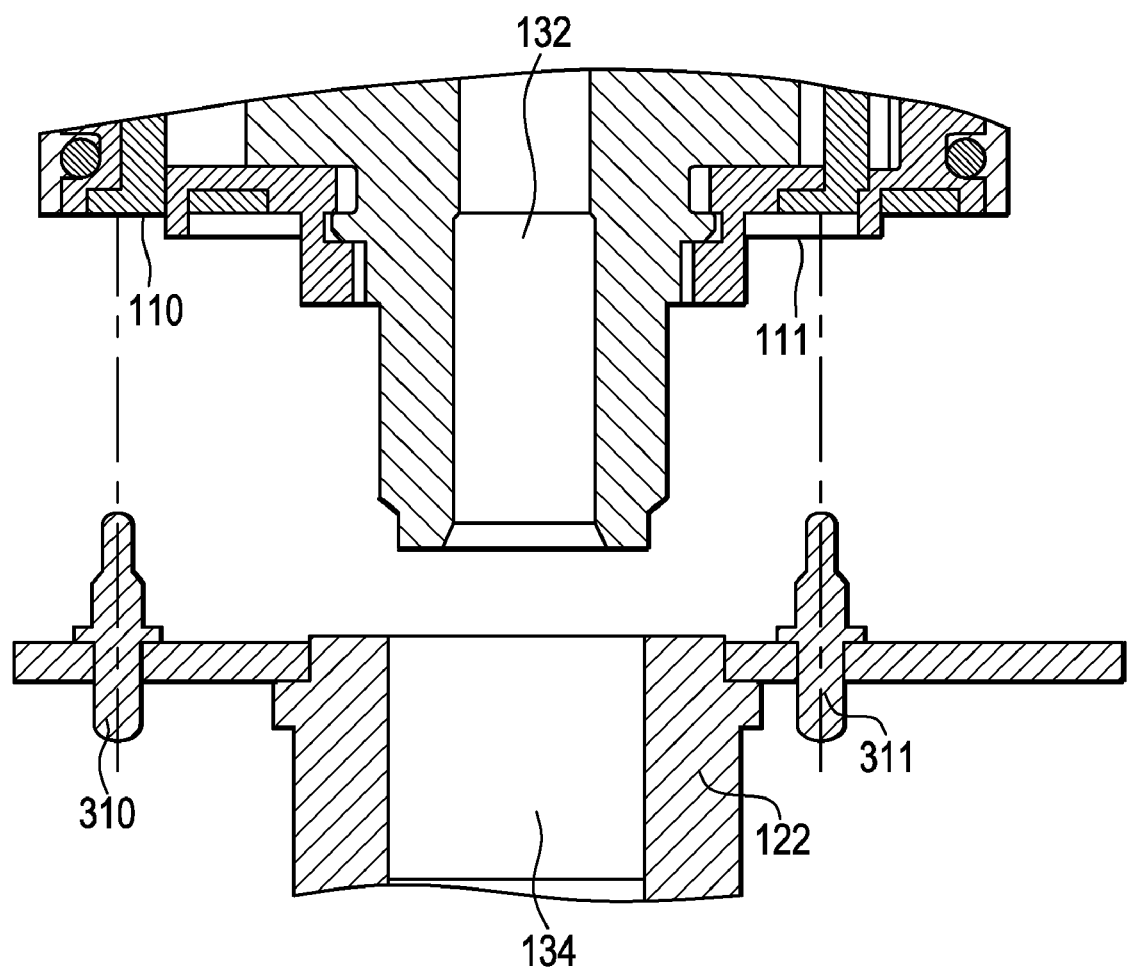
FIG. 2 illustrates a cross-section view of one embodiment of an interface between a sensing module and a base module of a measurement or calibration device.

There is provided a modular sensor assembly including a base module of a measurement or calibration device, and one or more interchangeable sensing modules externally mountable to the base module. FIG. 1 shows an exploded view, and FIG. 2 shows a cross-section of one embodiment of the interface of a sensing module and a base module. In one aspect, the sensing module 100 can be provided, depending upon the application requirements, e.g., by a pressure sensor, a voltage sensor, a temperature sensor, a humidity sensor, a flow sensor, a pressure calibrating module, a voltage calibrating module, a current calibrating module, etc. A skilled artisan would appreciate the fact that the present invention can be practiced with alternative types and configurations of sensing modules, and hence the description set forth herein is not intended to restrict or limit the practice of the present invention to any particular type of a sensing module.

Figure 3:
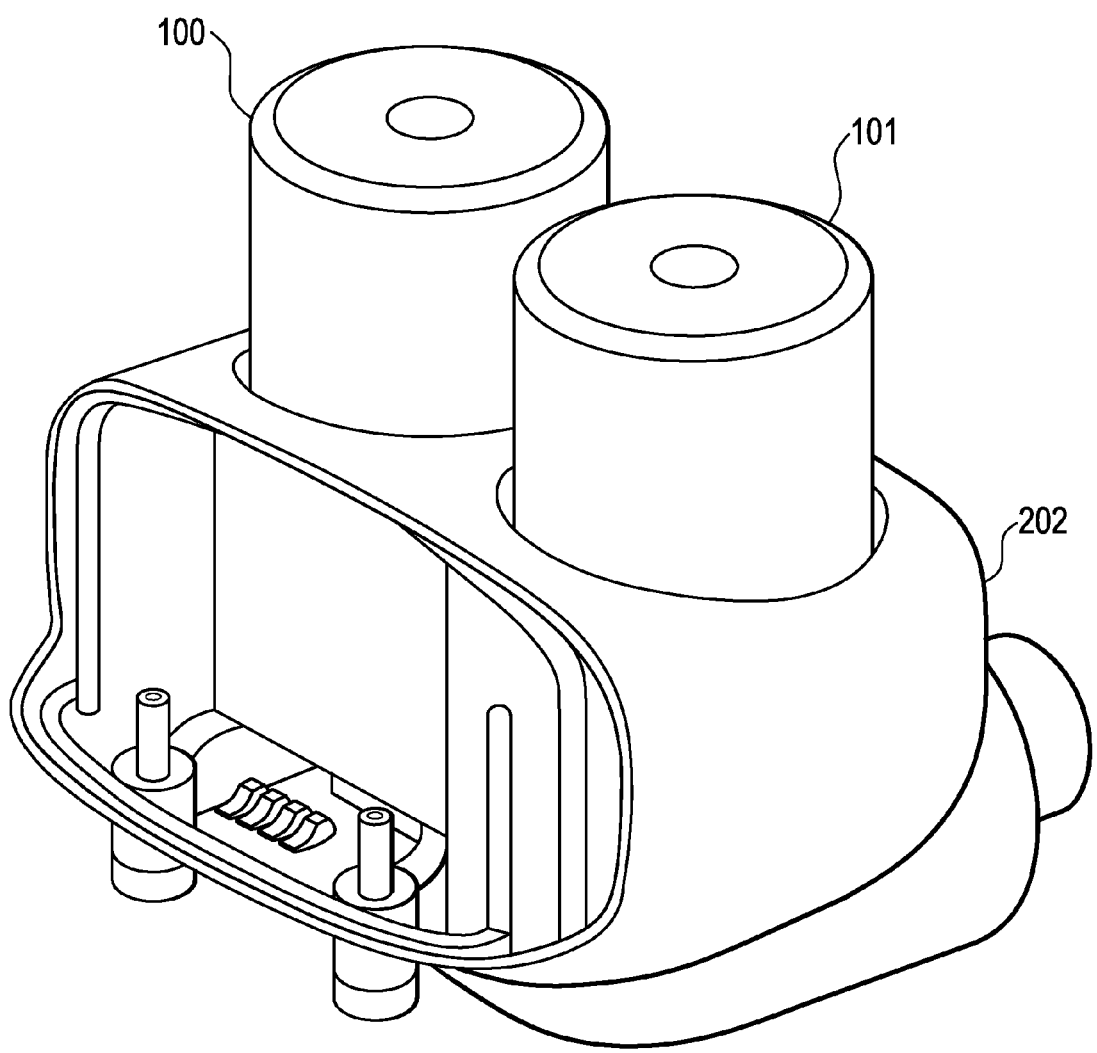
FIG. 3 illustrates one embodiment of a base module of a measurement or calibration device adapted to receive two sensing modules.

The sensing module 100 can be externally mountable to a base module 202, as best viewed in FIG. 3. FIG. 3 illustrates a base module 202 which is adapted to receive two sensing modules 100 and 101. In alternative embodiments, the base module 202 can be adapted to receive one or more sensing modules 100.

Referring again to FIGS. 1 and 2, components of the sensing module 100 can, in one aspect, be incorporated in a housing 102. In one aspect, the sensing module 100 can have substantially cylindrical form factor. In another aspect, the sensing module 100 can include a threaded spigot 104. The threaded spigot 104 can provide a mechanical attachment of the sensing module 100 to the interface part 120 of the base module 202. The threaded spigot 104 can be threadably attached to the base module receptacle 122 having an internal threaded part. The sensing module 100 can be driven into engagement with the base module 202 by an operator placing the spigot 104 into the base module receptacle 122 and rotating the sensing module 100 relative to the base module 202. Thus, the threaded interface can provide for establishing reliable mechanical connection of the sensing module 100 to the base module 202 using only hand movement force of the operator.

In another aspect, the diameter 106 of the spigot 104 can be the only controlled dimension of the interface between the sensing module 100 and the base module 202, thus allowing the sensing module 100 to be shaped in numerous form factors and in continuum of dimensions to satisfy alternative application needs, as well as be adapted to facilitate a secure grip of the sensing module 100 by the operator's hand.

In another aspect, the spigot 104 can be hollow, i.e., can have an opening 132 which, together with the opening 134 in the base module receptacle 122, can allow gas or liquid to move freely between the inside volumes of the sensing module 100 and the base module 202, which can be necessary for certain applications, e.g., pneumatic or hydraulic pressure measurement or calibration.

In one embodiment, the mechanical connection between the sensing module 100 and the base module 202 can be sealed to withstand high pressure values, which can be necessary, e.g., for applications involving pneumatic or hydraulic pressure measurement or calibration. For example, in one embodiment the mechanical connection between the sensing module 100 and the base module 202 can withstand pressure values up to 1000 bar. In one embodiment, the environmental sealing of the connection can be provided by one or more O-rings 302, 303, as best viewed in FIG. 4.

Figure 4:
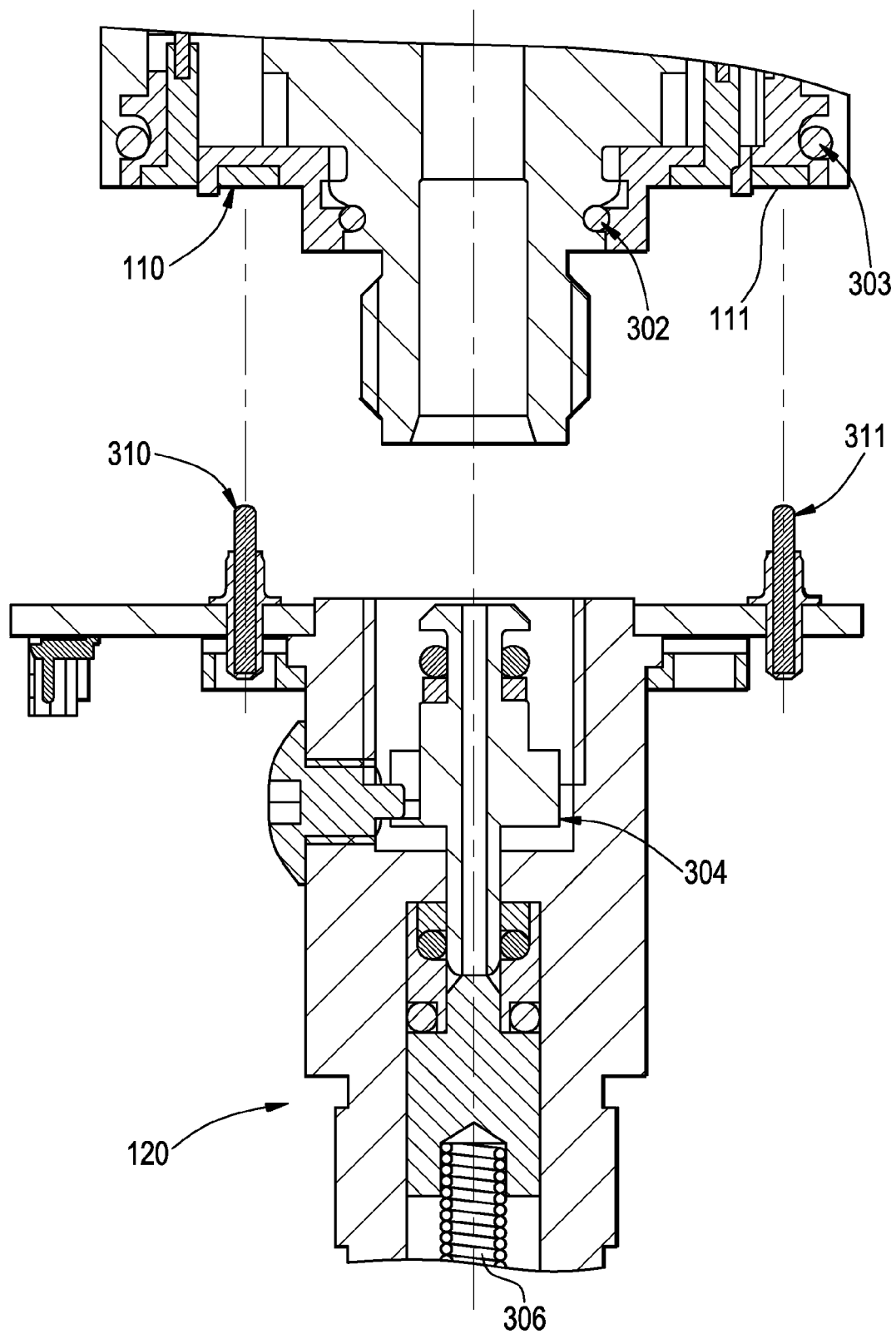
FIG. 4 illustrates a cross section view of one embodiment of an interface between a sensing module and a base module of a measurement or calibration device.

In another aspect, both the sensing module 100 and the base module 202 can remain sealed when disconnected from each other. FIG. 4 illustrates the base module interface part 120 being equipped with the isolation valve 304 which is in a normally closed state supported by a loaded spring 306 when no sensing module 100 is connected to the base module 202, thus shuttering the opening to the base module 202. The isolation valve 304 can be pushed to an open state by the spigot 104 when the sensing module 100 is rotatably tightened and connected to the base module 202. Conversely, when the sensing module 100 is being rotatably loosened and disconnected from the base module 202, the isolation valve 304 returns to its normally closed state, preventing the ejection of gas or liquid from the base module 202. A skilled artisan would appreciate the fact that other designs of the isolation valve 304 are within the spirit and the scope of the present invention.

In another aspect, the sensing module 100 can comprise one or more slip ring conductive tracks 110, 111 providing electrical coupling between the components of the sensing module 100 and the base module 202. In one embodiment, best viewed in FIG. 2, the slip ring conductive track 110 provides power transmission between the base module 202 and the sensing module 100. The slip ring conductive track 111 provides data transmission between the base module 202 and the sensing module 100. A skilled artisan would appreciate the fact that one or more conductive tracks providing power transmission, data transmission, and other functions are within the scope and spirit of the present invention.

In one embodiment, the slip ring conductive tracks 110, 111 can be provided by precious metal plating embedded into a non-conductive material (e.g., plastic).

In one embodiment, best viewed in FIG. 4, a pair of conductors in the form of spring loaded pins 310, 311 can be mounted on the interface part 120 of the base module 202 and can be adapted to make electrical contact with the respective slip ring conductive tracks 110, 111 when the sensing module 100 and the base module 202 are connected together. The pins 310, 311 can be made of a conductive material and be electrically coupled to the data transmission and power transmission circuitries of the base module 202.

In a further aspect, the spigot 104 and base module receptacle 122 can be made of a conductive material, and adapted to carry electrical ground connection between the sensing module 100 and the base module 202.

Figure 5:
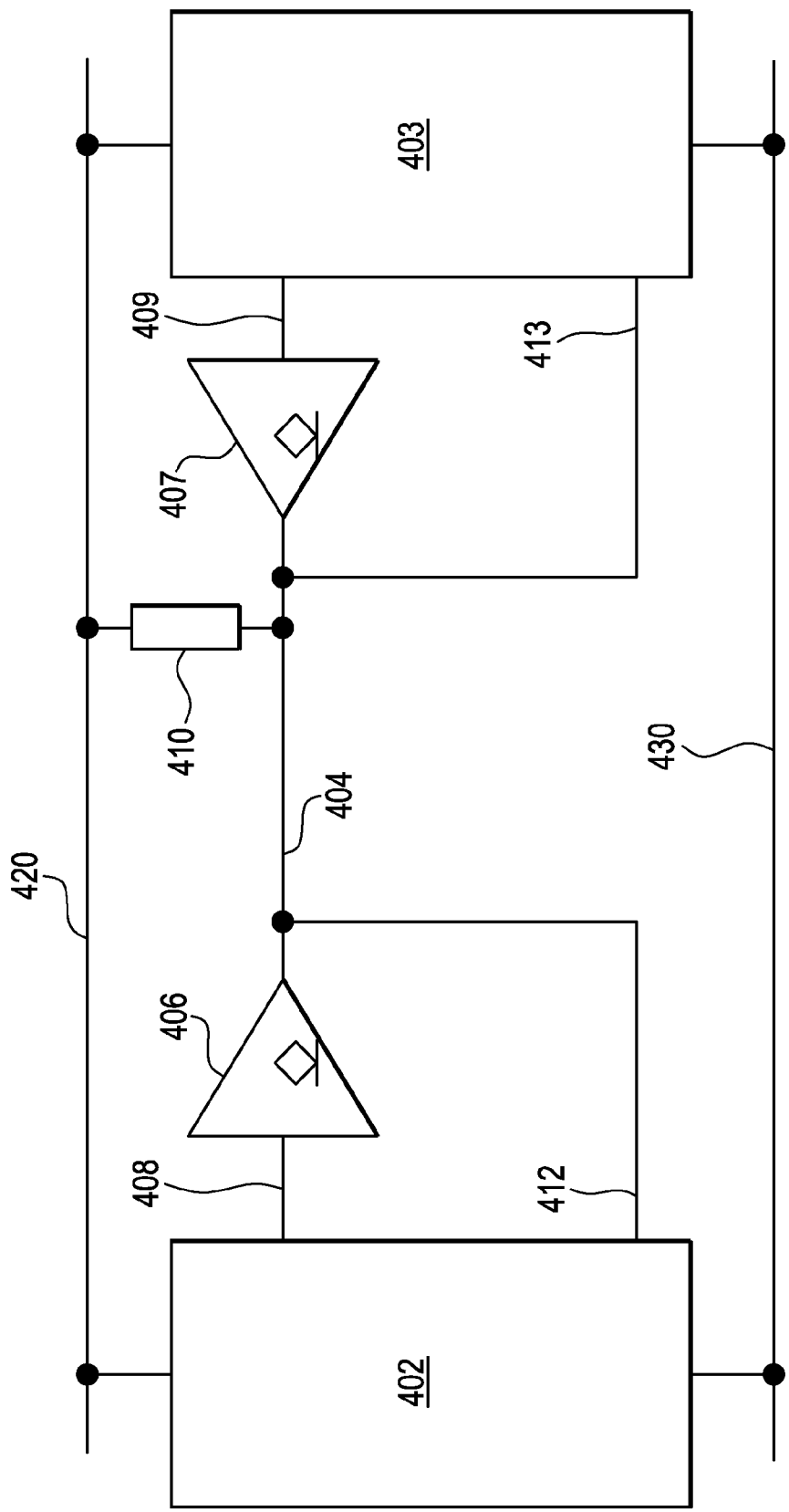
FIG. 5 illustrates an electrical diagram of one embodiment of a sample implementation of the physical layer of a data interface between a sensing module and a base module of a measurement or calibration device.

In one embodiment, bi-directional data transmission between the sensing module 100 and the base module 102 can be performed via a single data wire including a slip ring conductive track 111 in contact with a spring loaded pin 311 as described herein. The single-wire interface can provide half-duplex serial data transmission and operate according to the following sample specifications: 1 start bit, 8 data bits, 1 stop bit, odd parity, 115 Kbaud. The electrical diagram of a sample implementation of the physical layer of the data interface is shown in FIG. 5. A universal asynchronous receiver/transmitter (UART) 402 on the sensing module 100 side can communicate with a UART 403 on the base module 202 side over a single data line 404 via two non-inverting open collector drivers 406 and 407 buffering the output of the respective transmission ports 408, 409 of the two UARTs. The data line 404 can be pulled high by a pull-up resistor 410 when a transmission port is driven high. The respective receiving ports 412, 413 of the two UARTs can be coupled to the data line 404, thus providing half-duplex serial data communication via a single data line 404.

The power line 420 can be provided by a second conductive slip ring track 110 in contact with a spring loaded pin 310 as described herein, and the ground line 430 can be provided by the conductive spigot 104 in contact with the base module receptacle 122, as described herein.

In a further aspect, a specific hardware and software protocols can be employed to facilitate the data exchange over the data transmission line provided by the slip ring conductive track 111 and one or more brushes or pins.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A modular sensor assembly for performing measurement comprising:
 a sensing module comprising a threaded spigot, a first slip ring conductive track, and a second slip ring conductive track,
 a base module comprising a threaded receptacle, a first conductor, and a second conductor; and
 wherein said sensing module is detachably mounted to said base module by rotating said threaded spigot into said threaded receptacle thereby forming a first electrical connection between said first slip ring conductive track and said first conductor, and a second electrical connection between said second slip ring conductive track and said second conductor.

2. The assembly of claim 1, wherein said first electrical connection provides power transmission from said base module to said sensing module, and said second electrical connection provides data transmission between said base module and said sensing module.

3. The assembly of claim 2, wherein said data transmission is provided by a first universal asynchronous receiver transmitter (UART) in said sensing module, a second UART in said base module, and a data line formed by said second electrical connection.

4. The assembly of claim 1, wherein an electrical ground connection is formed between said threaded spigot and said threaded receptacle.

5. The assembly of claim 1, wherein said base module further comprises a base module inside volume, and said sensing module further comprises a sensing module inside volume; and
 wherein said threaded spigot further comprises a first opening and said threaded receptacle further comprises a second opening, said first opening and said second opening allowing gas or liquid to move freely between said sensing module inside volume and said base module inside volume.

6. The assembly of claim 5, wherein said base module further comprises an isolation valve for controlling the movement of said gas or liquid through said second opening, said isolation valve in a normally closed state and configured to be pushed to an open state by said threaded spigot when said sensing module is mounted to said base module.

7. The assembly of claim 1, wherein said first conductor is a spring loaded pin.

8. The assembly of claim 1, wherein said first slip ring conductive track is molded into a plastic substrate.

9. The assembly of claim 1, wherein said sensing module has a substantially cylindrical form factor.

10. The assembly of claim 1, wherein said sensing module is selected from the group consisting of: a pressure sensor, a voltage sensor, a temperature sensor, a humidity sensor, a flow sensor, a pressure calibrating module, a voltage calibrating module, and a current calibrating module.

11. The assembly of claim 1, wherein said sensing module further comprises an o-ring between said sensing module and said base module.

12. The assembly of claim 1, wherein a majority portion of said sensing module is external to said base module when mounted to said base module.

13. A method of detachably mounting a sensing module to a base module to form a modular sensor assembly for performing measurement, said method comprising:

rotating a threaded spigot of said sensing module into a threaded receptacle of said base module thereby forming a first electrical connection between a first slip ring conductive track of said sensing module and a first conductor of said base module, and a second electrical connection between a second slip ring conductive track of said sensing module and said second conductor of said base module.

* * * * *